United States Patent [19]

Tregonning

[11] Patent Number: 4,541,640
[45] Date of Patent: Sep. 17, 1985

[54] PISTON SEALING ARRANGEMENT

[75] Inventor: Geoffrey R. Tregonning, Chippenham, England

[73] Assignee: Westinghouse Brake and Signal Co., Chippenham, England

[21] Appl. No.: 458,968

[22] Filed: Jan. 18, 1983

[30] Foreign Application Priority Data

Jan. 29, 1982 [GB] United Kingdom ............... 8202636

[51] Int. Cl.[4] ............................................. F16J 15/32
[52] U.S. Cl. .................................... 277/152; 92/240; 92/244
[58] Field of Search .................... 92/240, 242, 244; 277/24, 152

[56] References Cited

U.S. PATENT DOCUMENTS

| 1,083,957 | 1/1914 | Trist | 92/244 |
| 2,313,271 | 3/1943 | Schnell | 92/240 |
| 3,443,486 | 5/1969 | Lanman | 92/244 |
| 4,053,166 | 10/1977 | Domkowski | 277/152 |
| 4,248,439 | 2/1981 | Haslett | 277/152 |

Primary Examiner—Robert I. Smith
Attorney, Agent, or Firm—Larson and Taylor

[57] ABSTRACT

A piston sealing arrangement particularly for pistons used in railway brake cylinders, comprising a flexible piston seal and a multi-function ring in the form of a separate wear band. The wear band is allocated on the pressure side of the piston seal to minimize radial motion of the sealing ring if the piston rocks.

Figure 1:
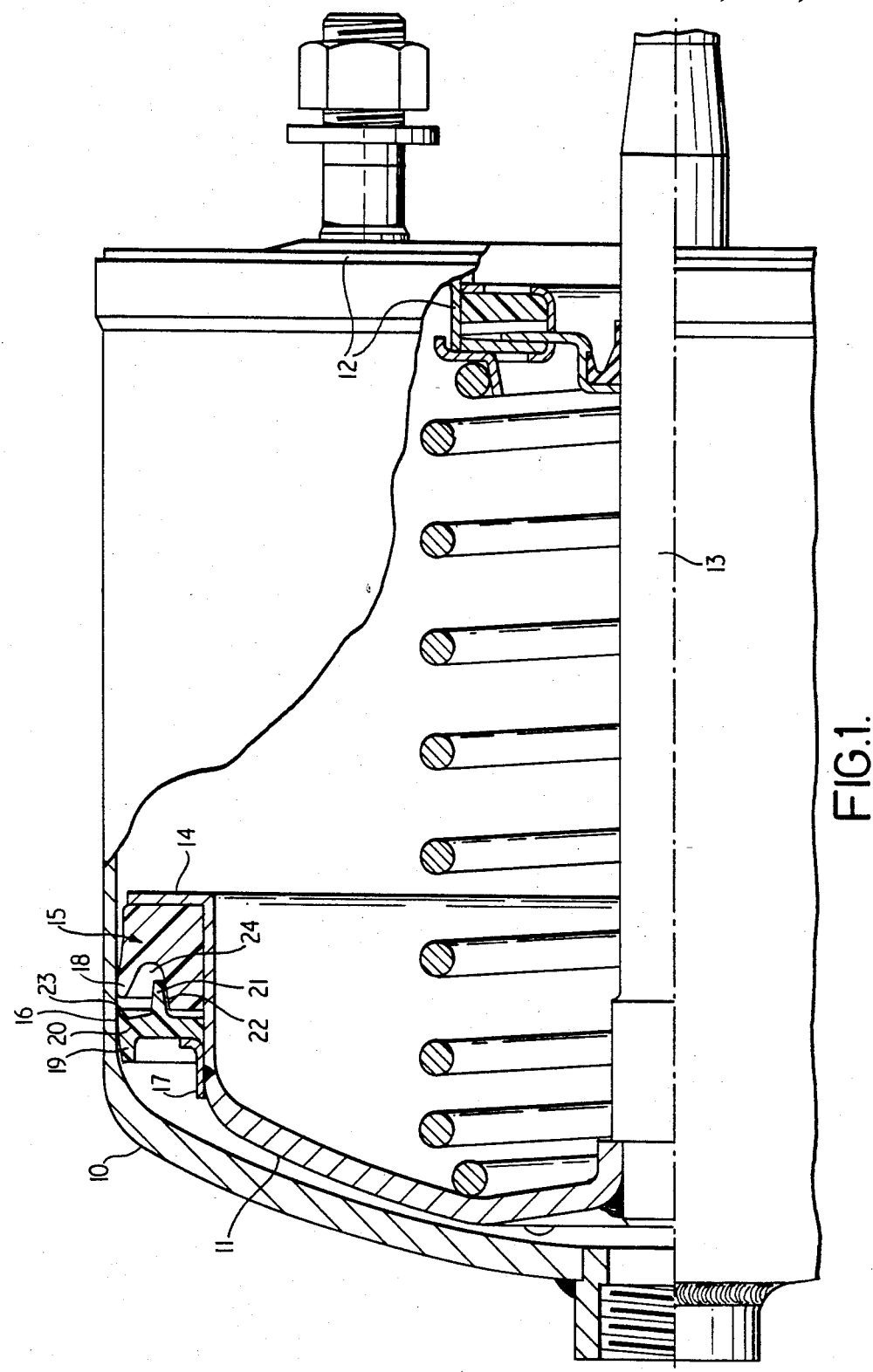

In FIG. 1 is shown a pneumatic brake cylinder 10 in which is located a piston 11. Piston 11 has an external flange 14 which backs a piston seal 15. Located on the pressure side of the piston seal 15 is a wear band 16 which is located very close to the piston seal 15 on the pressure side. The rubber piston seal 15, has a sealing lip 18 in contact with the inner wall of the cylinder 10.

The wear band is chamfered at 19 so that the portion 20 of the wear band closest to the sealing ring 15 is the part of the wear band that actually contacts the inner wall of the cylinder. The plane about which the wear band rocks passes through the portion 20 and this is closely adjacent the lip 18 which is the point of contact of the sealing ring with the cylinder.

The wear band has a small scraper lip 23 projecting towards the sealing ring 15. Between the wear band and the sealing ring is a grease retaining cavity 24. This cavity is partially formed by an annular recess in the face of the piston seal 15 and partially by the shape of the rear face of the wear band 16.

14 Claims, 2 Drawing Figures

PISTON SEALING ARRANGEMENT

This invention relates to a piston sealing arrangement and particularly to piston seals and wear bands as used on pneumatic piston/cylinder devices. Particularly, but not exclusively, the invention has application to brake cylinders of the kind which are used in railway brake systems. Historically, leather, normally mechanically loaded radially by some form of expander ring, was used for the seal between the piston and the cylinder wall. The transition from leather to rubber seals in pursuit of economy, reduction of air leakage and increased overall cylinder efficiency, was accompanied by the need to consider improved location of pistons within cylinder bores, because of the differing physical forms of the seals, differing material characteristics and because the rubber seals were primarily designed, in the first place, for use in hydraulic piston and cylinder arrangements where conditions are somewhat different. Certain features typical of hydraulic equipments, for example extremely tight dimensional tolerances and superfine surface finishes associated with minimal working clearances, are neither economically nor functionally appropriate to pneumatic cylinders of the type here considered. Also low initial pressure and, frequently, slow pressure rise in pneumatic systems make it necessary carefully to control seal lip contact with cylinder bore so as to avoid initial air bypass with consequent failure to build up operating pressure. A significant factor in the use of rubber seals in pneumatic arrangements is the lack of continuous lubrication provided by the fluid pressure media used with hydraulic arrangements. The capacity of leather to absorb and retain liquid grease type lubricants applied on assembly provided a measure of continuing lubrication in service for seals of that material. In contrast, natural and synthetic rubber seals are relatively impermeable and tend to scrape to each end of the operating stroke any grease applied during assembly, or subsequently by lubrication points.

Because of the relatively large piston/cylinder clearances used with piston and cylinder arrangements and the weight of the pistons, the seal tends to take a set in cold weather when not under pressure and is slow to recover for example after lengthy periods of parking on mechanical brake or during running where brake application may be infrequent. Furthermore the piston tends to knock against the cylinder wall causing damage through bottoming on the cylinder.

To minimise impact damage and to centralise the piston it has been customary to introduce a wear band behind the seal or piston ring i.e. on the low pressure side of the piston.

Another problem that arises is that it is customary to rebore cylinders and the lips of rubber seals will not usually maintain adequate sealing contact pressure within the additional diameter of the internal piston wall by their own elasticity. This makes the problem somewhat worse and, although the wear band helps, generally speaking it is necessary to have a new wear band, possibly a new piston and certainly a new seal on rebore. The problems are accentuated with rocking pistons because placing the wear band behind the seal causes a large radial movement of the seal lip when the piston rocks. Special and relatively expensive seals have been necessary in some cases in attempts to overcome problems inherent in lip deformation and minimal lubrication.

An object of the invention is to alleviate some or all of the problems by a particular design of expandable piston ring which, by virtue of its form and positioning relative to a standard readily obtainable and inexpensive seal element, combines in one single part advantages usually sought by a variety of means in association.

In accordance with the invention a piston sealing arrangement comprises a flexible piston seal and a multi-function ring, effectively a separate wear band, the wear band being located on the piston on the pressure side of the piston seal in order to bring the plane of contact between the wear band and the cylinder, about which the piston will rock, close to the line of contact between the piston seal and the wall of the cylinder thereby minimising the radial motion of the sealing ring at the seal line consequent upon any rocking of the piston.

Preferably the piston seal is in the form of a main portion with an external lip extending outwardly from the main portion at the pressure end of the piston ring, the lip acting as the seal between the piston and the cylinder. The wear band is preferably placed close to said lip.

It is preferred that the wear band should include an inner flange or projecting lip adapted to seat on a corresponding inner flange on the sealing ring. The wear band is preferably split so that it will expand to take up its position on the sealing ring. This enables the same wear band to be used even after a cylinder has been rebored, as will be apparent later in this specification.

The wear band and piston seal are preferably so shaped that a cavity or recess for a retention of grease is formed between the facing surfaces of the wear band and the piston seal. For example the piston seal may have an annular recess in its face which is adjacent the wear ring.

The lip of the piston seal may thus be arranged to scrape grease from the piston bore and deposit it in said cavity or recess. The wear band may also be formed with a lip which extends towards the piston seal so that it will also act as a scraper to collect grease which may bypass the sealing ring and deposit the grease in the cavity or recess.

The external surface of the wear ring, at the pressure end of the wear ring is preferably chamfered. This shallow chamfer on the edge of the wear ring remote from the seal and the similarly angled part of the seal periphery, on its non-pressure side, allows the grease film on the cylinder bore to bypass the one element for collection by the other, according to the direction of piston travel, maintaining effective lubrication at the moving interfaces and tending to maintain the grease annulus completely full of lubricant. The invention has particular application to rocking pistons i.e. pistons which are pivoted on piston rods or pistons attached to rods which themselves are pivoted externally of a cylinder.

The piston seal may be made of any suitable resilient material but is preferably of natural or artificial rubber or a plastic material. The wear band is preferably of a harder low friction material such as a plastic e.g. nylon or acetal. In appropriate circumstances it could also be made of other materials such as soft metal alloys.

Figure 2:
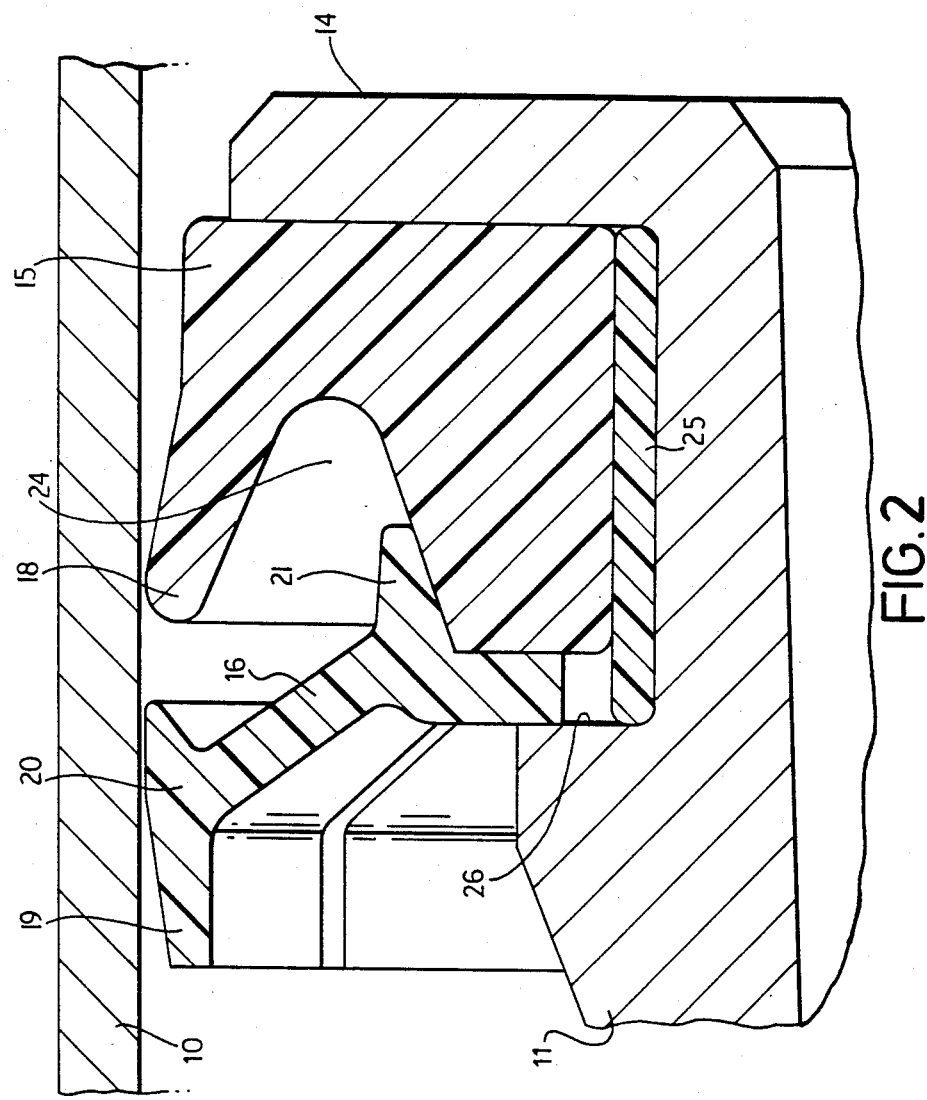

In the accompanying drawings,

FIG. 1 is a side elevation partially in section of a railway brake cylinder, and piston arrangement embodying the invention, and FIG. 2 is an enlarged section of a modified piston sealing arrangement incorporating the piston ring and wear ring in accordance with this invention.

FIG. 1 shows a pneumatic brake cylinder 10 in which is located a piston 11, the cylinder being closed by an end plate 12 with a sealing arrangement between the end plate 12 and a rod 13 attached to the piston 11. The sealing arrangement is the subject of our co-pending application claiming priority from G.B. Patent Application No. 8202637 filed 29th Jan., 1982.

The piston 11 has an external radially directed flange 14 which acts as a backing plate for a piston seal 15. Located on the pressure side of the piston seal 15 is a wear band 16 held in place by an L-shaped ring 17 welded to the piston 11.

It will be noted that the wear band 16 is located very close to the piston seal 15 on the pressure side of the piston seal 15. The piston seal 15, which is made of rubber, has a sealing lip 18 which acts as the seal in contact with the inner wall of the cylinder 10.

The wear band is chamfered at 19 so that the portion 20 of the wear band closest to the sealing ring 15 is the part of the wear band that actually contacts the inner wall of the cylinder. The plane about which the wear band rocks passes through the portion 20 and this is closely adjacent the lip 18 which is the point of contact of the sealing ring with the cylinder. The wear band has a lip or flange 21 adapted to seat on a corresponding inner flange 22 of the sealing ring 15.

The wear band also has a small scraper lip 23 projecting towards the sealing ring 15. Between the wear band and the sealing ring is a grease retaining cavity 24. This cavity is partially formed by an annular recess in the face of the piston seal 15 and partially by the shape of the rear face of the wear band 16.

Because the point of contact of the wear band with the wall of the piston is close to the lip 18 of the piston seal 15, the amount of movement of the lip 18 when the piston rocks is very small.

The combination of the lips 23 and 18 ensures that grease is collected within the grease cavity 24 so that there is always a supply of grease to the sealing arrangement. The fact that the piston seal 15 is of resilient material (rubber) which flexes during applications and releases of pneumatic pressure ensures that there is a constant movement of the grease and this, in conjunction with the tendency to a rudimentary circulation induced by the shapes of wear band and seal during stroking of the piston, maintains a band of effective lubricant at the interface of seal lip and cylinder bore.

If the cylinder is rebored then a standard piston seal and the same wear band may be used after the rebore. To enable this to be done an additional rubber ring is placed around the piston adjacent the flange 14, the rubber seal 15 is then stretched over the additional ring so as to bring the seal lip 18 radially further out towards the enlarged diameter inner wall of the cylinder, and then the wear band may be fitted slightly expanded, over the newly positioned piston seal. The fact that the wear band is split enables this to be done.

With this arrangement of wear band and piston ring the effect is of close piston/bore clearance without actual and damaging metallic contact between the parts and there is thus more positive maintenance of the piston centrally, notwithstanding relatively wide dimensional tolerances, since the resilience of the base of the seal on which the wear band is located permits compliance by the split wear band with variations in cylinder diameter. Furthermore, rocking of the piston is permitted at least 3° either side of normal and even when rocking occurs there will always be good contact between the seal lip and the cylinder bore, adequately lubricated to ensure an efficient and effective seal. A further advantage is the cushioning effect of seal base and wear band resilience, minimising the effects of vibration-induced shock loading and preventing metal to metal impact between piston and cylinder bore. Thus, although re-boring is provided for, the operational period prior to re-bore may be greatly extended or reboring may not be required at all since the damaging, scuffing, impacts between piston and cylinder are eliminated co-incidentally with improved lubrication.

The facility of rocking the piston without loss of sealing efficiency permits the use of simpler, lighter, less expensive piston rod assemblies capable of following the arcuate motion of levers operated by the cylinder assembly without recourse to cross-heads or piston trunk tubes with separate loose rods.

FIG. 2 shows a more detailed modified version of the invention. The L shaped ring 17 is not employed, the wear band 16 and piston seal 15 being trapped in a recess 26 in the piston 11. In this drawing the cylinder is shown as having been rebored and a seal expander ring 25, which is continuous rather than split, and is made of a similar material to the seal 15, is located in the recess to support the seal 15. In other respects the construction is similar to that shown in FIG. 1.

The thickness of seal expander ring 25 represents the radial difference between the old and new cylinder bores. The piston ring or seal 15 is expanded by the ring 25 to maintain the original ring/seal/cylinder relationship.

Having thus described our invention what I claim is:

1. A piston sealing arrangement consisting of:
   a piston and a cylinder with said piston movably located in said cylinder and having a pressure and a non-pressure side, said piston also being designed to be rockable at least 3° either side of normal in a radial plane in said cylinder;
   a flange extending radially from said piston adjacent the non-pressure side of said piston;
   a flexible piston sealing ring located on said piston, said piston ring being U-shaped, opening axially toward the pressure side of said piston and engaging said flange on the pressure side of said flange; and
   a single multi-function ring in the form of a single separate wear band located on said piston on the pressure side of said piston ring, said wear band being relatively rigid compared to said piston ring and having a relatively thin circumferential portion providing contact with said cylinder such that the plane of contact between said circumferential portion of said wear band and said cylinder is the radial plane about which said piston rocks, said wear band also being located close to the line of contact between said piston ring and said cylinder such that the radial motion of said piston ring during rocking of said piston is minimized.

2. A piston sealing arrangement according to claim 1, in which the piston sealing ring comprises a main portion and an external lip extending outwardly from the main portion at the pressure end of the piston ring, the lip acting as the seal between the piston and the cylinder.

3. A piston sealing arrangement according to claim 2 in which the wear band is placed close to said lip.

4. A piston sealing arrangement according to claim 1 in which the U-shaped piston sealing ring comprises an outer sealing portion and an inner flange which extend axially, and the wear band includes an inner projecting lip extending axially into said U-shaped piston sealing ring and seating on said inner flange on the piston sealing ring.

5. A piston sealing arrangement according claim 4 in which the wear band is split so that it will expand to take up its position on the piston sealing ring.

6. A piston sealing arrangement according to claim 1 in which the wear band and the piston sealing ring have facing surfaces and the wear band and piston sealing ring are so shaped that a cavity for retention of grease is formed between the facing surfaces of the wear band and the piston sealing ring.

7. A piston sealing arrangement according to claim 6 in which the piston sealing ring has an annular recess in its face which is adjacent the wear band.

8. A piston sealing arrangement according to claim 6 in which the lip of the piston sealing ring is located and arranged to scrape grease from the piston bore and deposit it in said cavity.

9. A piston sealing arrangement according to claim 8 and including a lip on the wear band, said lip extending towards the piston sealing ring so that it will also act as a scraper to collect grease, which may bypass the piston sealing ring, and deposit the grease in the cavity.

10. A piston sealing arrangement according claim 1 and including a piston rod, the piston being pivoted on said piston rod.

11. A piston sealing arrangement according to claim 1 in which the piston sealing ring is made of natural or artificial rubber or a plastics material.

12. A piston sealing arrangement according to claim 1 in which the wear band is made of a hard low friction plastics material.

13. A piston sealing arrangement according to claim 1 in which the wear band is made of a soft metal alloy.

14. A piston sealing arrangement according to claim 1 in which the external surface of the wear band, at the pressure end of the wear band, is chamfered.

* * * * *